United States Patent
Kulkarni (10) Patent No.: US 7,811,490 B2
(45) Date of Patent: Oct. 12, 2010

(54) BORON NITRIDE FILLED PTFE

(75) Inventor: Ameet Kulkarni, Fairport, NY (US)

(73) Assignee: Garlock Sealing Technologies, Inc., Palmyra, NY (US)

(*) Notice: Subject to any disclaimer, the term of this patent is extended or adjusted under 35 U.S.C. 154(b) by 89 days.

(21) Appl. No.: 12/027,136

(22) Filed: Feb. 6, 2008

(65) Prior Publication Data

US 2008/0185750 A1 Aug. 7, 2008

Related U.S. Application Data

(60) Provisional application No. 60/899,653, filed on Feb. 6, 2007.

(51) Int. Cl.
*C08F 14/26* (2006.01)

(52) U.S. Cl. .................... 264/127; 264/290.2

(58) Field of Classification Search ............ None
See application file for complete search history.

(56) References Cited

U.S. PATENT DOCUMENTS

| | | | |
|---|---|---|---|
| 4,380,521 A | 4/1983 | Moreno et al. | |
| 4,762,330 A * | 8/1988 | Lonne et al. | 277/627 |
| 5,763,082 A * | 6/1998 | Kokumai et al. | 428/402 |
| 5,945,217 A * | 8/1999 | Hanrahan | 428/389 |
| 6,305,483 B1 * | 10/2001 | Portwood | 175/371 |
| 6,406,030 B1 * | 6/2002 | Fang et al. | 277/407 |
| 6,598,690 B2 * | 7/2003 | Peterson | 175/371 |
| 2002/0191483 A1 * | 12/2002 | Ohtsuki et al. | 366/107 |
| 2003/0132579 A1 | 7/2003 | Hoyes et al. | |
| 2005/0006858 A1 * | 1/2005 | Hoyes et al. | 277/628 |
| 2005/0194710 A1 * | 9/2005 | Baron et al. | 264/123 |

* cited by examiner

*Primary Examiner*—Mary Lynn F Theisen
(74) *Attorney, Agent, or Firm*—Holland & Hart LLP (57) ABSTRACT

A composition is provided that, in one aspect, may be used in the production of sealing materials, such as gaskets. The composition includes a polytetraflouroethylene matrix and a Boron Nitride filler. In one aspect, the Boron Nitride filler may be provided as a hexagonal, close-packed, Boron Nitride filler that is homogeneously dispersed within the polytetraflouroethylene matrix. In at least one embodiment, the composition is formed by combining quantities of polytetraflouroethylene, Boron Nitride filler, hydrocarbon liquid, and solvent. The liquid and solvent may be removed through various processes prior to sintering the composition to form a full-density, Boron Nitride filled, polytetraflouroethylene matrix that exhibits improved sealability, greater resistance to permeation, and less color contamination.

9 Claims, 12 Drawing Sheets

BORON NITRIDE FILLED PTFE

CROSS-REFERENCE TO RELATED APPLICATION

The invention claims priority from U.S. Provisional Patent Application No. 60/899,653 entitled BORON NITRIDE FILLED PTFE, filed on Feb. 6, 2007, which Provisional patent application is hereby incorporated by reference in its entirety.

OTHER RELATED PATENTS

U.S. Pat. No. 4,900,629, entitled "High Compressibility Gasket Material," issued on Feb. 13, 1990; U.S. Pat. No. 4,913,951, entitled "Fabrication of Reinforced Gasketing Material," issued on Apr. 3, 1990; U.S. Pat. No. 4,961,891, entitled "Method of Making High Compressibility Gasket Material," issued on Oct. 9, 1990; and U.S. Pat. No. 4,990,296, entitled "Welding of Filled Sintered Polytetraflouroethylene," issued on Feb. 5, 1991; are each hereby incorporated herein by reference in their entirety.

BACKGROUND

Polytetraflouroethylene ("PTFE") is a chemically inert polymer with a wide service temperature of −450° F.-500° F. PTFE is the material of choice for such industrial products as tubing, o-rings, diaphragms, valve seats, gaskets and seals. However, PTFE in its original pure form is known for high deformation or creep under load. Flange gaskets made of pure PTFE will flow or creep under the stress of bolt load, resulting in a loss in flange tightness and subsequent leakage over time. Lip seals made of pure PTFE will also deform under pressure resulting in leakage. To overcome the high creep problem fillers are incorporated in the matrix of PTFE. Filled PTFE materials such as this were first commercialized by Garlock Sealing Technologies in 1968 and marketed as GYLON gasket materials. GYLON Styles are reinforced with various filler materials, including glass micro-spheres, silica, barium sulfate and graphite at different percent filler levels. Filler material lowers creep and improves functional performance of the PTFE matrix. However, the filler material can result in porosity of the PTFE matrix, cause discoloration or contamination.

Figure 1:
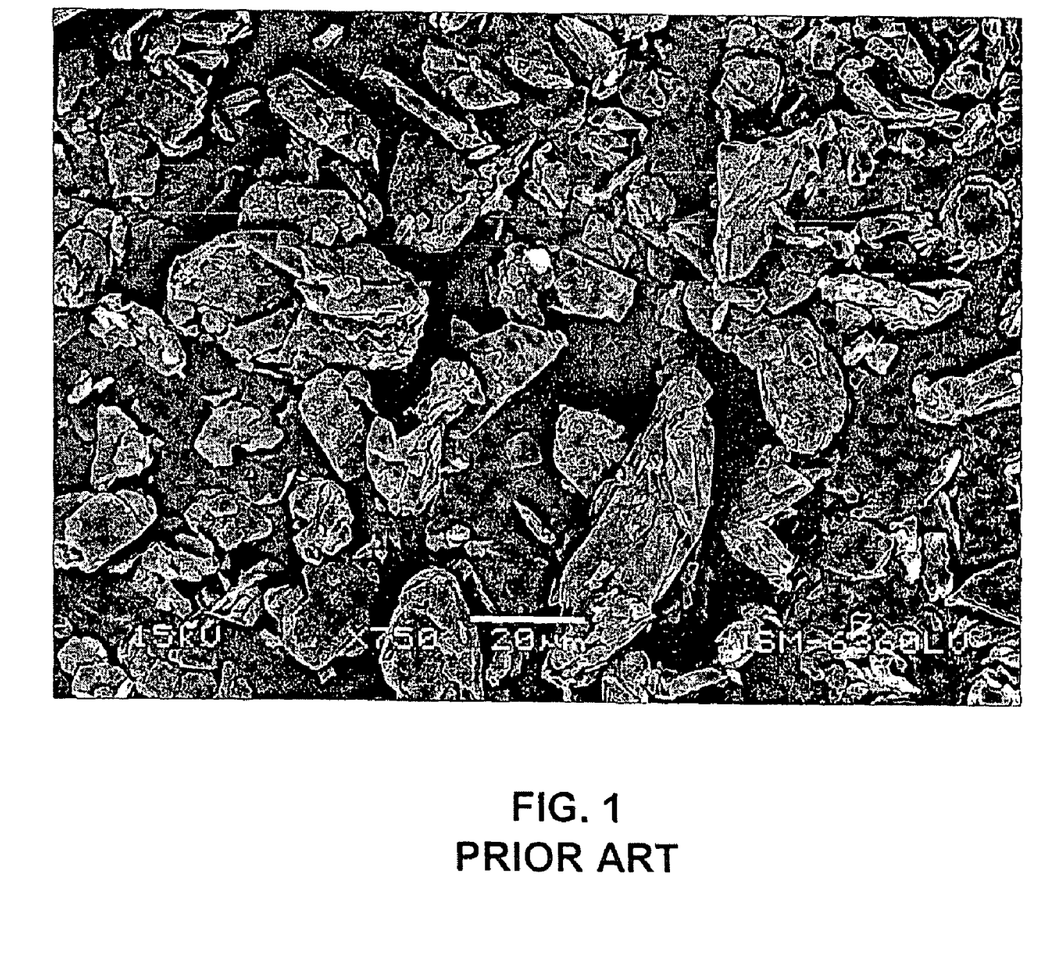
FIG. 1 shows a scanning electron microscope image of graphite powder.
Figure 10:
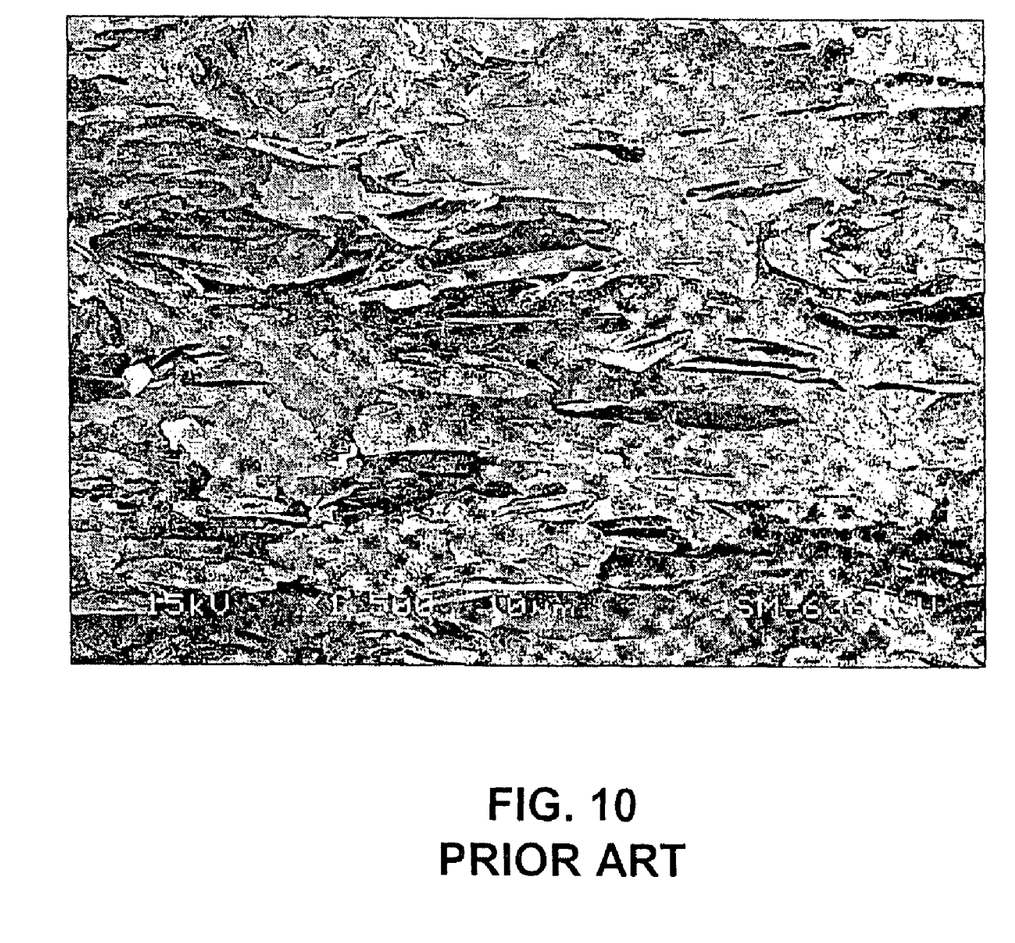
FIG. 10 shows a scanning electron microscope image of a graphite filled polytetraflouroethylene sheet.

Referring to FIGS. 1 and 10, scanning electron microscope ("SEM") images of flake graphite powder are shown. Currently, graphite-filled PTFE is used as a gasket material in monomer service applications. For example, graphite-filled PTFE is commercially available and sold by Garlock Sealing Technologies as GYLON Style 3530 sheets, gaskets, and lip seals. GYLON Style 3530 was introduced in about 1982.

Graphite filled PTFE, which is black in color, has an average particle size of about 5 to 100 μm and a agglomerated filler particle shape of a hexagonal platelets. Other properties of graphite filled PTFE are as follows. The average tensile strength (ASTM D1708) of graphite-filled PTFE is about 4000 psi. The compressibility (ASTM F36) is about 12 percent. The recovery (ASTM F36) is about 54 percent. The creep relaxation (ASTM F36) is about 56 percent. The sealability measured as gas permeability (DIN 3535) is about 0.011 cc/min. The weight change after a 16 hour soak in Magnaflux SKL-WP at 1 ATM is 0.05 percent. The weight change after a 16 hour soak in Magnaflux SKL-WP at 30 ATM is about 0.07 percent. The Magnaflux SKL-WP soak is a penetrability test that measures how much of a dye penetrates the sample and is measured by weight change of the sample as well as visual inspection.

Graphite filled PTFE is perceived as contaminating and may not be acceptable in color-sensitive environments such as biological, pharmaceutical applications, or chemical process applications. Particles of graphite from the graphite filled PTFE could become free and contaminate the media. Adding a dye cannot mask the black color of graphite. Graphite filled PTFE also has a significant number of voids. In some conventional processes, a gasket of graphite filled PTFE can be structurally weakened by the media. The monomer media can polymerize in the gasket, expand and cause the gasket to split.

SUMMARY

This Summary is provided to introduce a selection of concepts in a simplified form that, are further described below in the Detailed Description. This Summary is not intended to identify key aspects or essential aspects of the claimed subject matter. Moreover, this Summary is not intended for use as an aid in determining the scope of the claimed subject matter.

The product and structure described herein addresses the color and contamination problems associated with conventional products, such as graphite filled polytetraflouroethylene ("PTFE"). The pharmaceutical industry and the high-volume polyolefin market have a high sensitivity and desire a gasket or other sealing material that will not contaminate the process fluid where those media will not affect the gasket's structural properties. Because an additional additive, such as a dye, to the PTFE cannot cure the deficiencies of graphite, the PTFE requires a new filler material.

In one aspect, a PTFE powder is deagglomerated in a hydrocarbon liquid with a mixing device. A Boron Nitride filler is blended with the PTFE resin and a light hydrocarbon solvent. The slurry may then be filtered to remove at least a portion of the hydrocarbon liquid from the PTFE resin and fillers to form a cake. Remaining quantities of hydrocarbon liquid may help lubricate and orient the particles of the PTFE resin and Boron Nitride as the cake is calendared. In at least one embodiment, the structure may be pressed into a preformed structure, which can be fibrillated to form sheets by this calendaring process. In another aspect, squeezing the cake through the calendar rolls produces a biaxially oriented sheet. The sheet may then be dried to remove any remaining lubricant. The sheet may then be sintered to form a full-density PTFE matrix that contains substantially homogeneously dispersed hexagonal close-packed Boron Nitride filler.

The Boron Nitride filled PTFE product and structure described herein can provide an alternative to graphite-filled PTFE by having improved sealability, greater resistance to permeation, and less contamination due to the white color of the Boron-Nitride filled PTFE.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings, figures, and images.

It is to be understood that both the foregoing general description and the following detailed description are exemplary and explanatory and are intended to provide further explanation of the invention as claimed.

DRAWINGS

The present invention will be more clearly understood from a reading of the following description in conjunction with the accompanying exemplary figures wherein.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Figure 2:
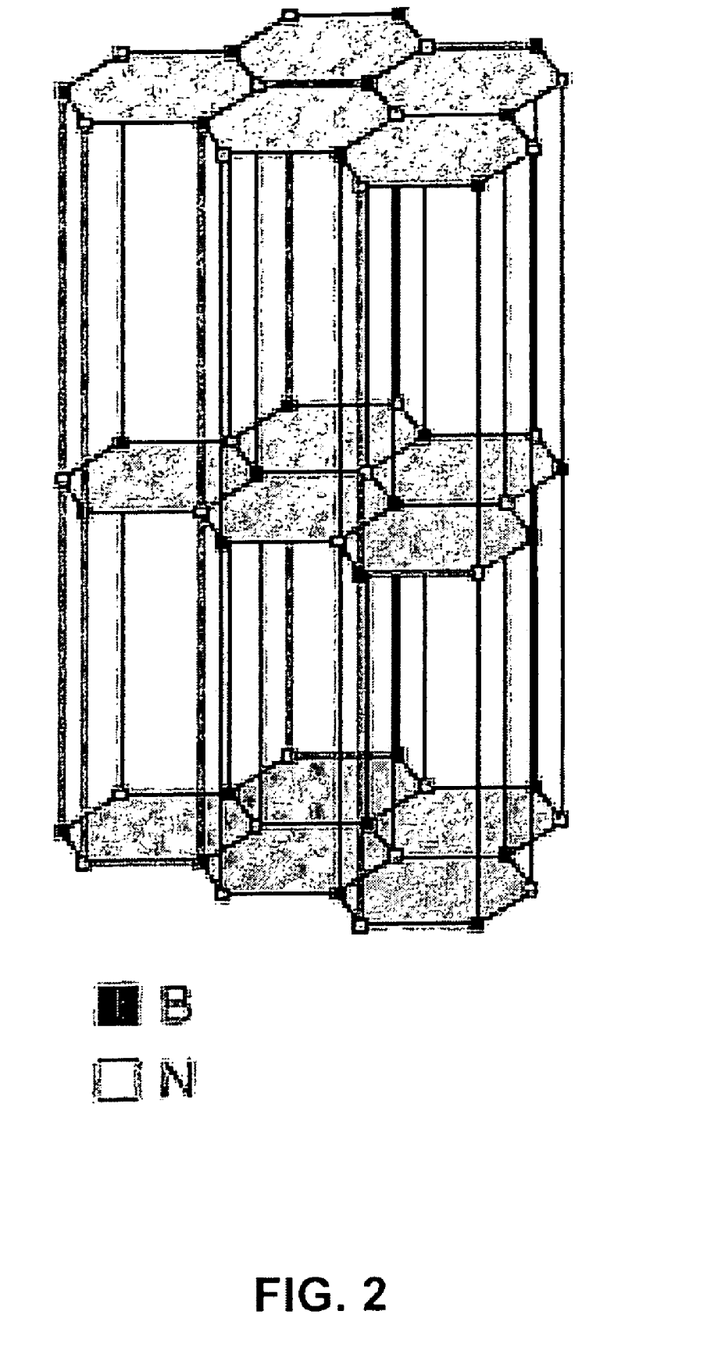
FIG. 2 shows a molecular structure of hexagonal Boron Nitride according to an embodiment of the present invention.
Figure 3:
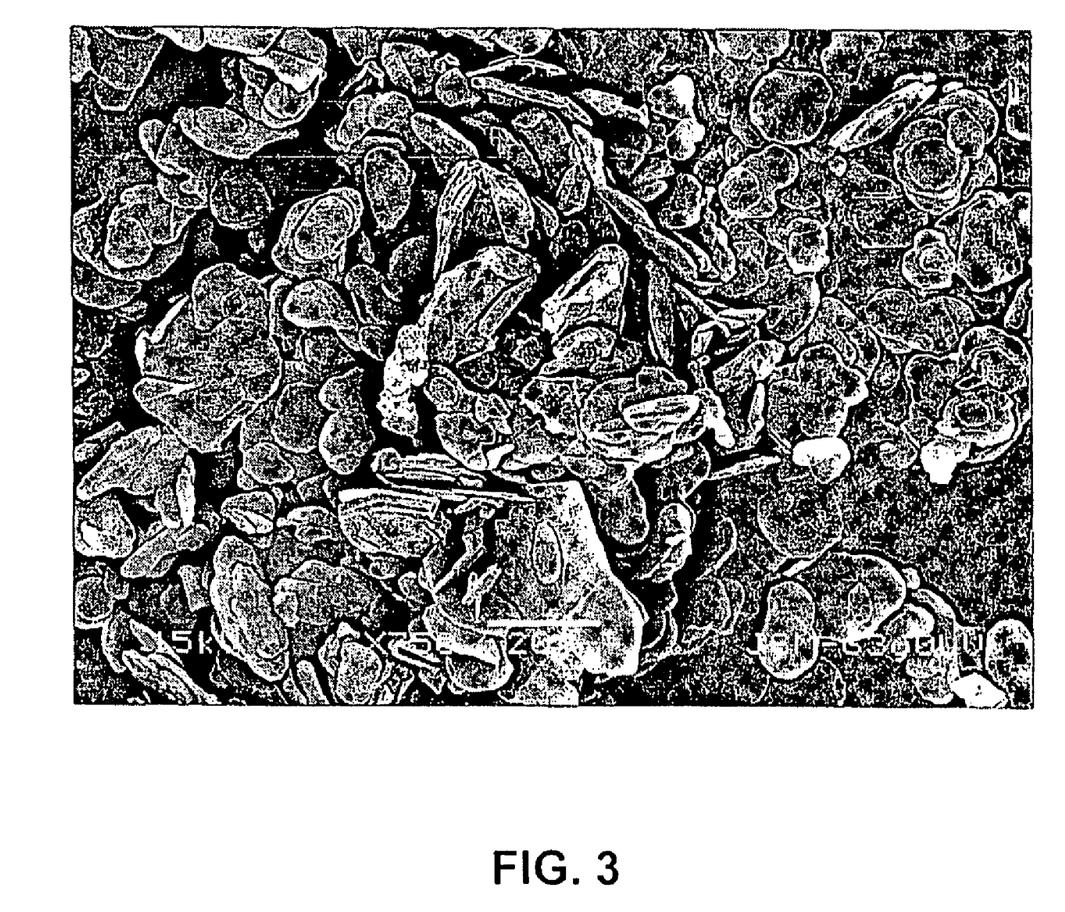
FIG. 3 shows a scanning electron microscope image of Boron Nitride powder according to an embodiment of the present invention.

Referring to FIG. 2, a molecular structure of hexagonal Boron Nitride is shown. Boron Nitride is a combination of the elements of Boron and Nitride, and has an empirical formula of BN. Referring to FIG. 3, A scanning electron microscope ("SEM") image of Boron Nitride powder is shown. Hexagonal Boron Nitride is commonly referred to as "white graphite" and is naturally white in color.

Boron Nitride can be used as a solid lubricant (up to 900° C. in oxidizing atmospheres) and/or in situations where the electrical conductivity or chemical reactivity of graphite would be problematic. Boron Nitride can also be used as a reinforcement in plastics, ceramics, and alloys where good thermal properties and low wear are desired.

Rather than using graphite as a filler for polytetraflouroethylene ("PTFE") in producing gaskets and other sealing materials, Boron Nitride can be used. The process for manufacturing Boron Nitride filled PTFE is similar to the process used for manufacturing graphite filled PTFE.

The processing information for typical manufacturing PTFE filled compositions can be found in U.S. Pat. Nos. 4,900,629, 4,913,951, 4,961,891, and 4,990,296, which are all incorporated herein by reference in their entirety. Other manufacturing processes for PTFE filled compositions known to one of ordinary skill in the art can also be utilized herein.

Figure 4:
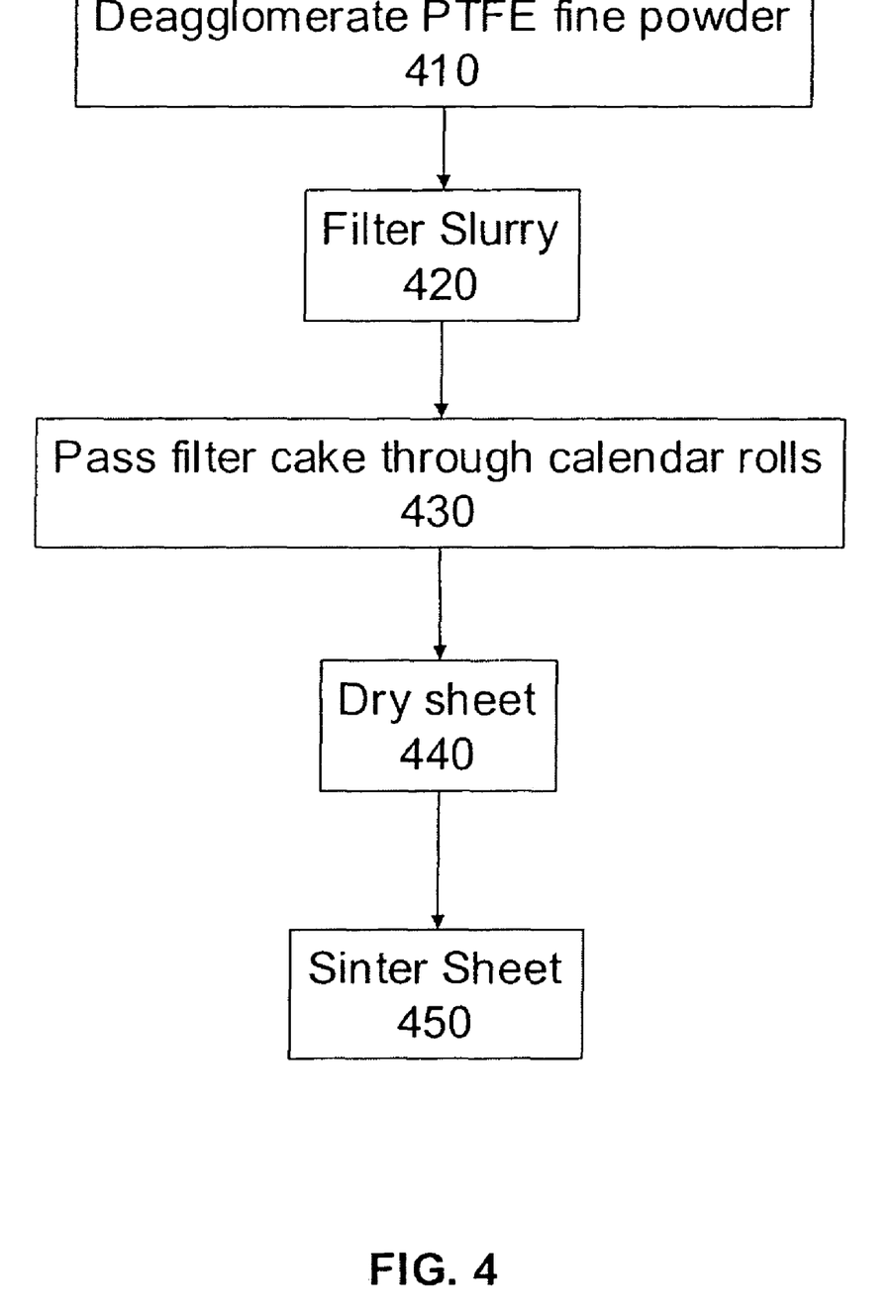
FIG. 4 shows a process of producing Boron Nitride filled polytetraflouroethylene according to an embodiment of the present invention.

In accordance with one exemplary embodiment, a process of producing Boron Nitride-filled PTFE is shown in FIG. 4. PTFE can be produced according to conventional methods, such as DuPont HS-10 processing. For example, the process can involve deagglomerating 410 a PTFE fine powder (e.g., 500 to 600 micrometer particles) in a hydrocarbon liquid using a high-speed mixer. A Boron Nitride filler is blended with the PTFE resin and a light hydrocarbon solvent. The slurry prepared is then filtered 420 to remove the bulk of the hydrocarbon liquid from the PTFE resin and fillers to form a cake. The remaining hydrocarbon provides adequate lubrication so that the particles of the PTFE resin and Boron Nitride are oriented as the cake is passed back and forth through calendar rolls 430. The structure can be pressed into a pre-formed structure, which can be fibrillated to form sheets by this calendaring process. Squeezing the cake through the calendar rolls produces a biaxially oriented sheet. The sheet may then be dried 440 to remove the lubricant. The sheet is then sintered 450 at temperatures greater than about 640° F. (338° C.).

Figure 9:
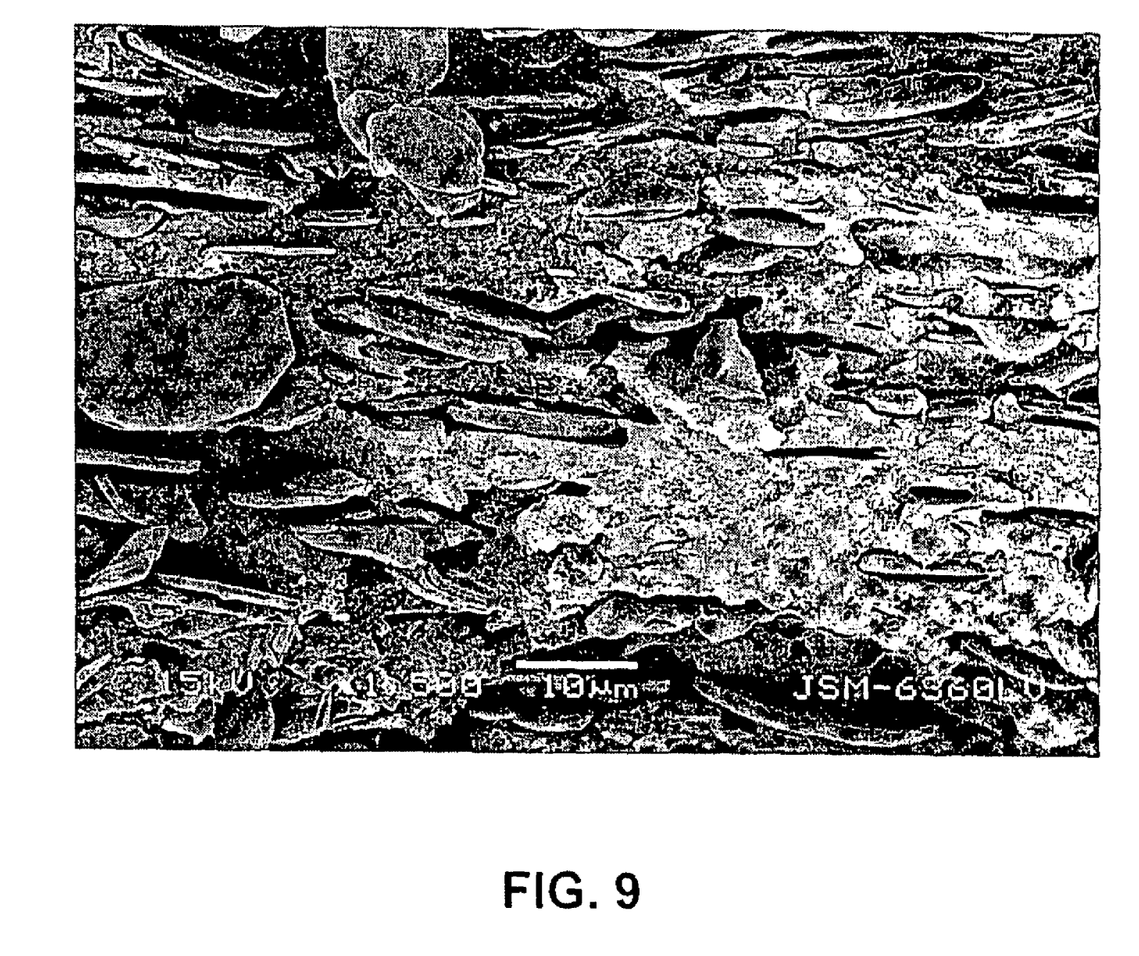
FIG. 9 shows a scanning electron microscope image of a Boron Nitride filled polytetraflouroethylene sheet according to an embodiment of the present invention.

Once sintered, the resulting structure is considered a full-density PTFE matrix containing substantially homogeneously dispersed hexagonal close-packed Boron Nitride filler. In one exemplary embodiment, the Boron Nitride filler comprises about 20 percent by weight of the Boron Nitride filled PTFE structure. Referring to FIG. 9, an SEM image of a Boron Nitride filled PTFE sheet is shown. In contrast, referring to FIG. 10, an SEM image of a graphite filled PTFE sheet is shown.

The properties of Boron Nitride filled PTFE are desirable to graphite filled PTFE. Boron Nitride filled PTFE, which is white in color, can have an average particle size of about 13 μm and a filler particle shape of a hexagonal plate. One exemplary embodiment of Boron Nitride filled PTFE has the following properties. The average tensile strength (ASTM D1708) of Boron Nitride filled PTFE is about 5000 psi. The compressibility (ASTM F36) is about 18 percent. The recovery (ASTM F36) is about 41 percent. The creep relaxation (ASTM F36) is about 60 percent. The gas permeability (DIN 3535) is about 0.011 cc/min. The weight change after a 16 hour soak in Magnaflux SKL-WP at 1 ATM is about 0.01 percent. The weight change after a 16 hour soak in Magnaflux SKL-WP at 30 ATM is about 0.02 percent.

Figure 5A:
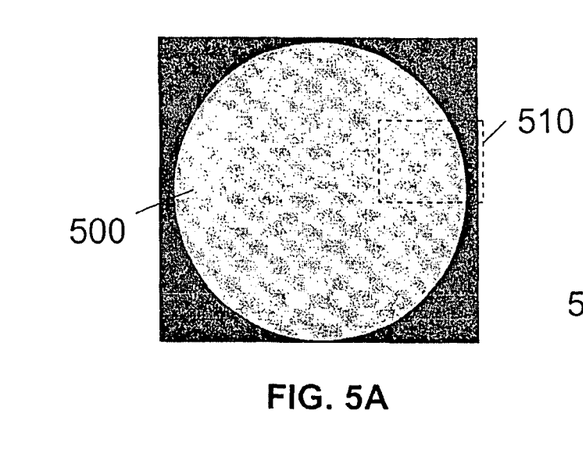
FIG. 5A to 5D show a top view, a surface view, a side view, and a cross-sectional view, respectively, of a sample of Boron Nitride filled polytetraflouroethylene according to an embodiment of the present invention.
Figure 5B:
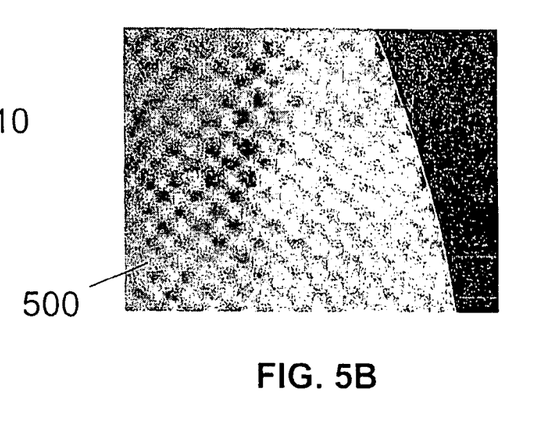
Figure 5C:
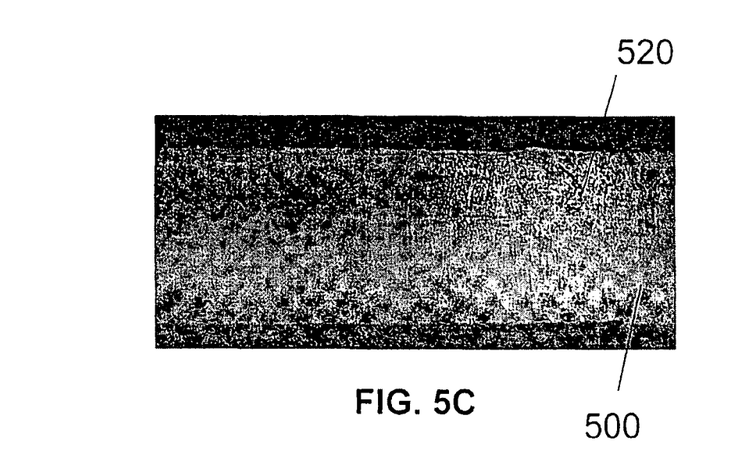
Figure 5D:
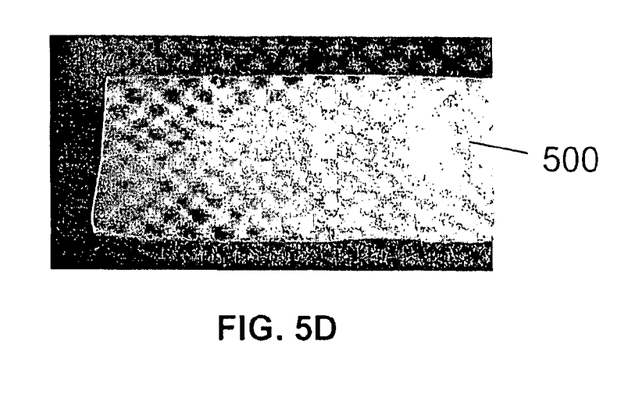
Figure 6A:
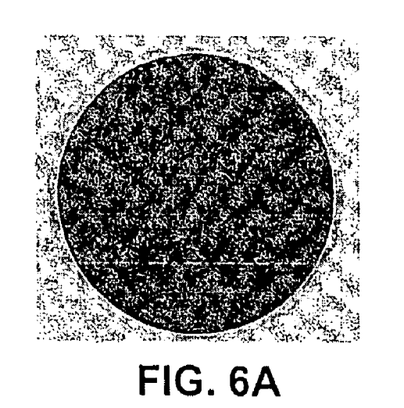
FIG. 6A to 6D show a sample of graphite filled polytetraflouroethylene after penetrant testing.
Figure 6B:
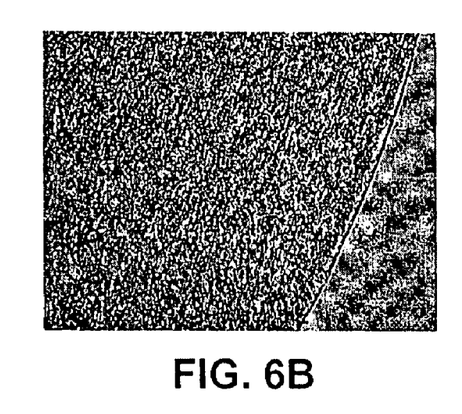
Figure 6C:
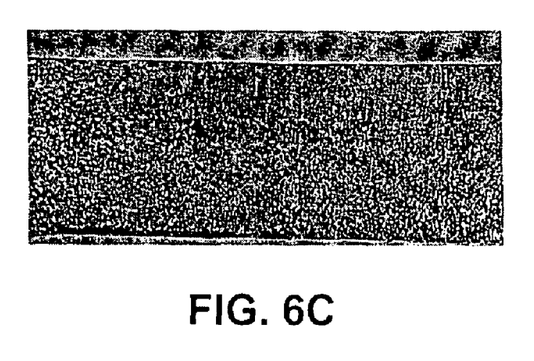
Figure 6D:
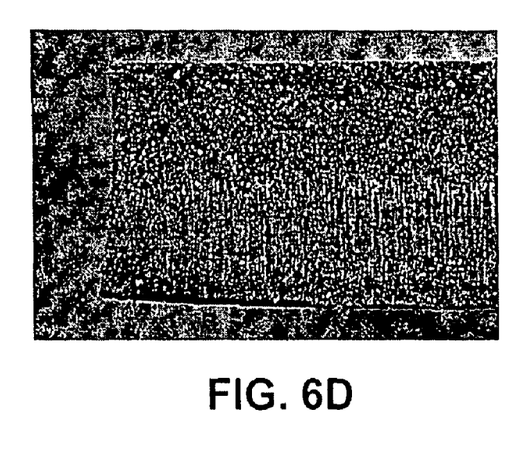
Figure 6E:
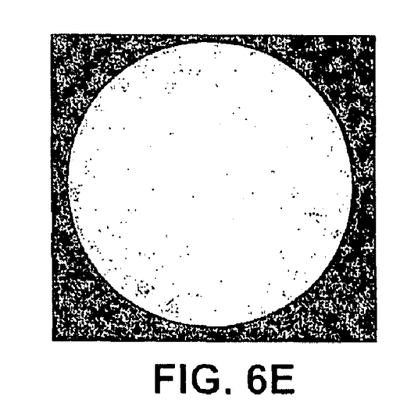
FIG. 6E to 6H show a sample of Boron Nitride filled polytetraflouroethylene after penetrant testing according to an embodiment of the present invention.
Figure 6F:
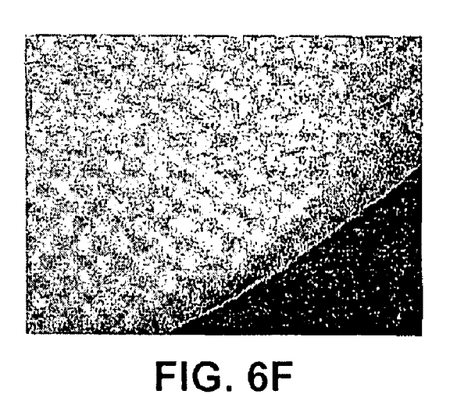
Figure 6G:
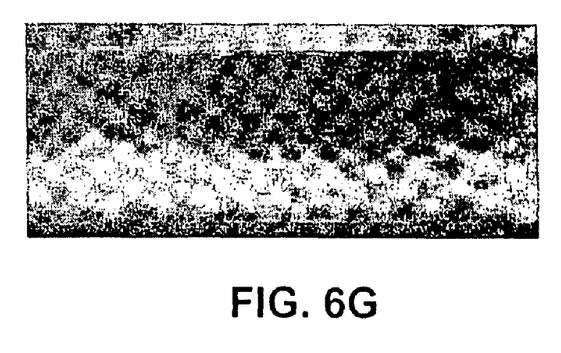
Figure 6H:
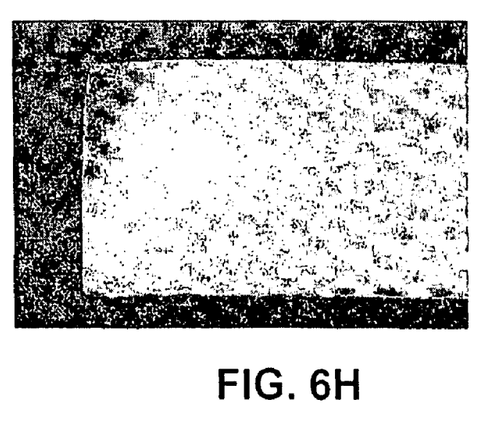

Referring to FIGS. 5A to 5D, a sample 500 of Boron Nitride filled PTFE is shown. The sample, which is ⅛ inches thick, has been soaked for 16 hours in Magnaflux SKL-WP at ambient pressure. FIG. 5A shows a top view of sample 500. FIG. 5B shows a view of section 510 of the surface of sample 500. FIG. 5C shows a side view of sample 500 and penetration of a dye 520. FIG. 5D shows a cross-sectional view of sample 500. As shown in FIGS. 5A to 5D, the sample 500 has minimal penetration by Magnaflux SKL-WP. The weight percent change after a 16 hour soak at a standard temperature and pressure was at most about 0.01 percent. The surface of sample 500 was generally unaffected by the soak, as penetration was mostly limited to scratched areas. As shown in FIGS. 5C and 5D, the edges of the sample 500 were slightly compromised with the dye cut. In conventional products, the edges where the dye exists the material is often damaged or even warped, allowing for greater penetration.

Referring to FIGS. 6A to 6H, samples of graphite filled PTFE and Boron Nitride filled PTFE are shown after penetrant testing. FIGS. 6A to 6D show various views of a sample of graphite filled PTFE and FIGS. 6E to 6H show various views of a sample of Boron Nitride filled PTFE. In this experiment, samples of 1/8" Black Gylon graphite filled PTFE and Boron Nitride filled PTFE were immersed in a Magnaflux SKL-WP and subjected to 30 ATM of pressure in N, atmosphere for 16 hours. In comparison to those experiments where the materials were immersed in Magnaflux SKL-WP at ambient pressure for 16 hours, the samples gained slightly more weight (about 0.01% more for Boron Nitride-filled PTFE and 0.02% more for graphite-filled PTFE).

Figure 7A:
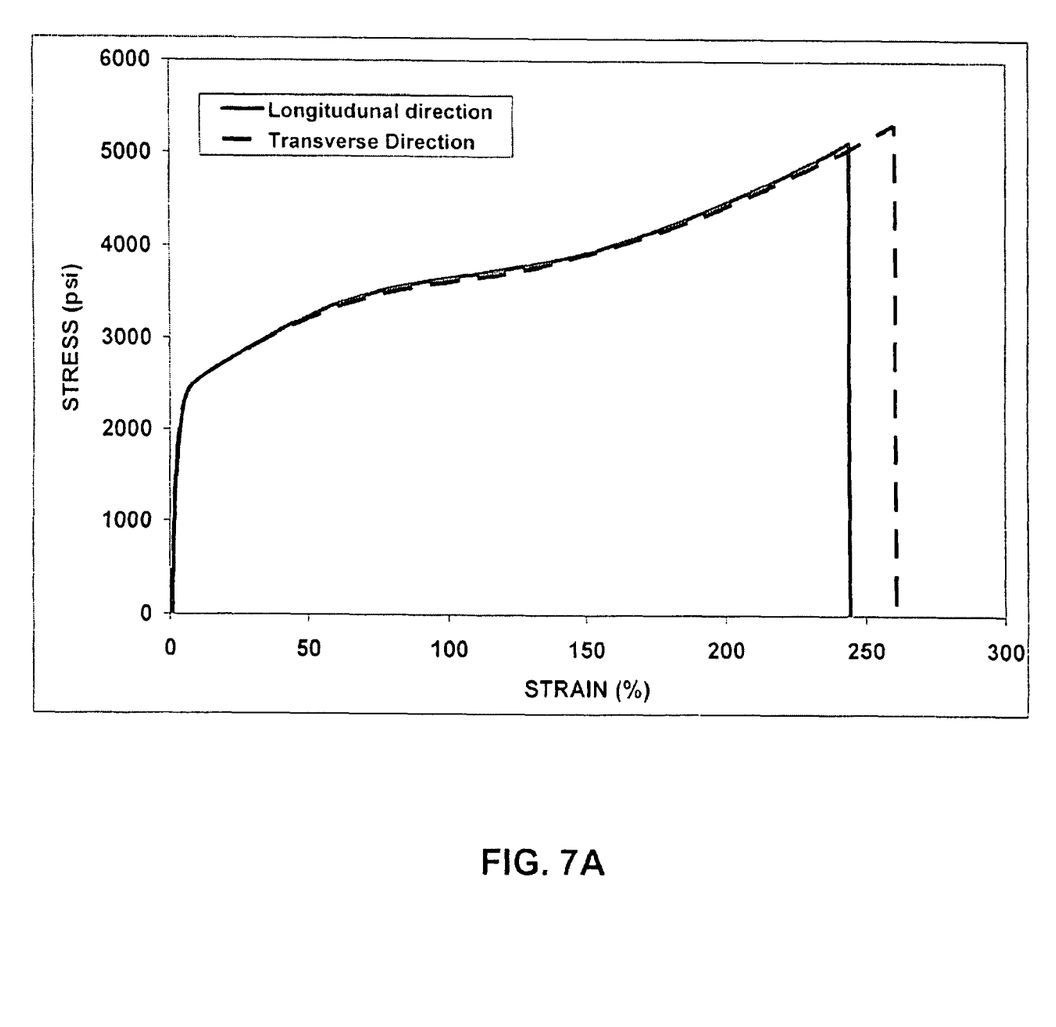
FIG. 7A shows a stress-strain curve of Boron Nitride filled polytetraflouroethylene according to an embodiment of the present invention.
Figure 7B:
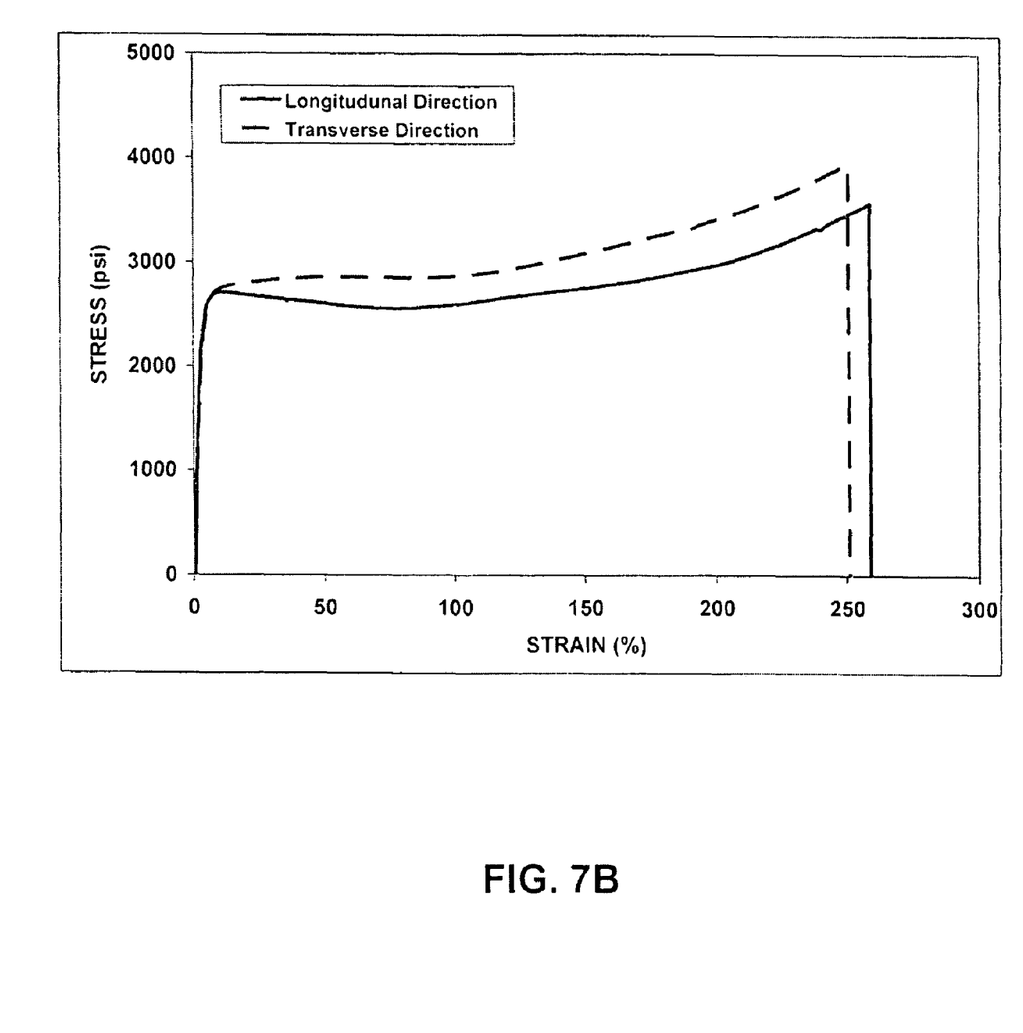
FIG. 7B shows a stress-strain curve of graphite filled polytetraflouroethylene.

With regards to tensile strength, the Boron Nitride filled PTFE is desirable over graphite filled PTFE. Referring to FIG. 7A, a stress-strain curve of Boron Nitride filled PTFE is shown. The Boron Nitride filled PTFE samples are about 1/16 inches thick. The Boron Nitride filled PTFE samples were tested at about 77° F. Referring to FIG. 7B, a stress-strain curve of graphite filled PTFE is shown. These samples of graphite filled PTFE are 1/16 inches thick. Stress-strain tests were performed using ASTM D1708. As shown in FIGS. 7A and 7B, the average tensile strength of Boron Nitride filled PTFE is about 5000 psi and the average tensile strength of graphite filled PTFE is about 4000 psi.

Figure 8:
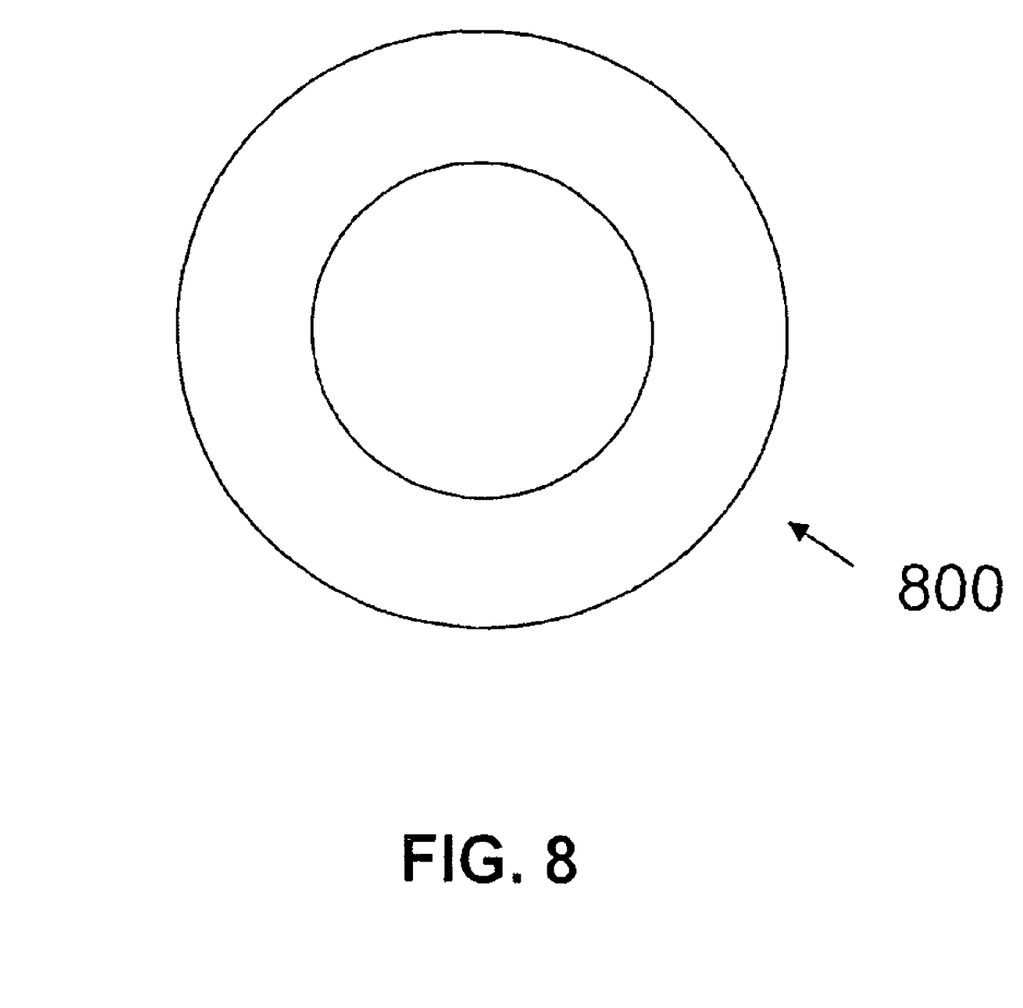
FIG. 8 shows a gasket according to an embodiment of the present invention.

In producing gaskets of Boron Nitride filled PTFE according to one exemplary embodiment, discrete gaskets can be cut from large sheets. Referring to FIG. 8, a gasket 800 is shown. The gasket 800, according to the present invention, is made from Boron Nitride filled PTFE and has a white color. In conventional gaskets, the gasket is made from graphite filled PTFE and has a black color. Uses for these gaskets or seals include, but are not limited to, corrosive chemical applications desiring non-contaminating chemically resistant properties, FDA or pharmaceutical applications requiring non-contaminating properties, and monomer service applications requiring superior resistance against permeability, such as the manufacture of vinyl chloride monomer.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5-8, 9.9994, and so forth).

What is claimed is:

1. A process for making polytetraflouroethylene matrix-based material, the process consisting essentially of:
    combining polytetraflouroethylene particulate and a hydrocarbon liquid to form a polytetraflouroethylene resin;
    mixing Boron Nitride filler with the polytetraflouroethylene resin and a solvent to form a slurry; and
    removing at least a portion of the hydrocarbon liquid from the polytetraflouroethylene resin to form a cake.

2. The process of claim 1 wherein said solvent is comprised of a light hydrocarbon solvent.

3. The process of claim 1 wherein the removal of at least a portion of the hydrocarbon liquid is at least partially accomplished through filtration.

4. The process of claim 1 further comprising:
    calendaring the cake to form a biaxially oriented sheet of material.

5. The process of claim 4 further comprising:
    pressing the sheet of material into a pre-formed structure; and
    fibrillating the pre-formed structure to form sheets.

6. The process of claim 4 wherein at least a portion of the hydrocarbon liquid is left in the polytetraflouroethylene resin that lubricates and orients particles of the polytetraflouroethylene resin and Boron Nitride as the cake is calendared.

7. The process of claim 4 further comprising:
    drying the sheet of material to substantially remove a substantial portion of any remaining hydrocarbon liquid.

8. The process of claim 7 further comprising:
    sintering the sheet to form a full-density polytetraflouroethylene matrix containing homogeneously dispersed hexagonal close packed Boron Nitride filler.

9. The process of claim 8 wherein said Boron Nitride filler comprises about 20 percent by weight of the Boron Nitride filled polytetraflouroethylene sheet.

* * * * *